United States Patent

[11] 3,590,714

[72] Inventor: Artur Schops, Munich, Germany
[21] Appl. No.: 860,682
[22] Filed: Sept. 24, 1969
[45] Patented: July 6, 1971
[73] Assignee: Steinheil-Lear Siegler AG, Munich, Germany
[32] Priority: Sept. 28, 1968
[33] Germany
[31] G 67 53 832.3

[54] PHOTOGRAPHIC APPARATUS WITH TWO-WAY OBJECTIVE
10 Claims, 5 Drawing Figs.

[52] U.S. Cl. .................................. 95/44, 95/64
[51] Int. Cl. .................................. G03b 3/00
[50] Field of Search .......................... 95/44

[56] References Cited
UNITED STATES PATENTS
2,381,228  8/1945  Schmidt ................. 95/44

Primary Examiner—Samuel S. Matthews
Assistant Examiner—Edna M. Berd
Attorney—Michael S. Striker ABSTRACT: An invertible objective can be connected to a ring-shaped holder on the body of a camera in two positions in one of which the holder conceals a manually operable selector for the aperture size. The diaphragm in the objective is closed in automatic response to attachment of the objective in the one position and the diaphragm is then coupled to the automatic exposure control in the camera body. When the objective is attached in the other position, the selector is accessible so that the desired aperture size can be set by hand.

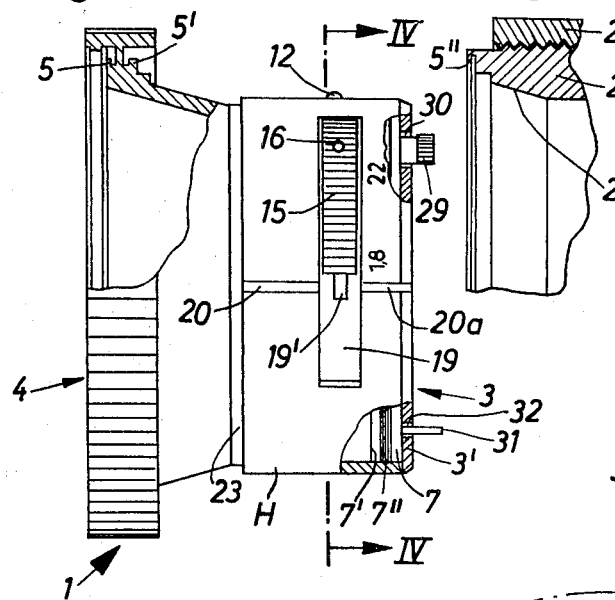
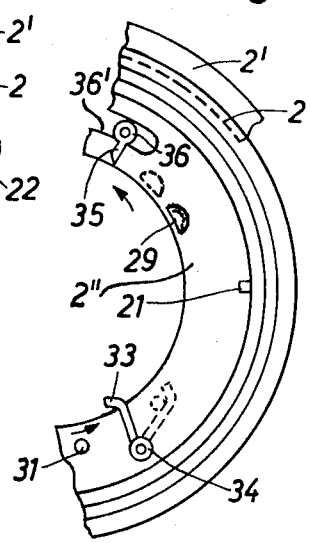
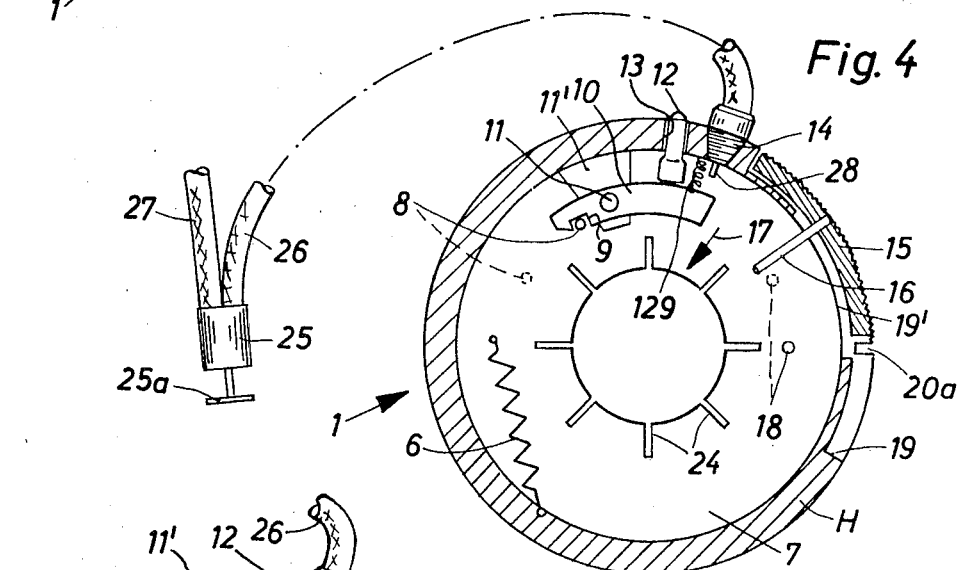
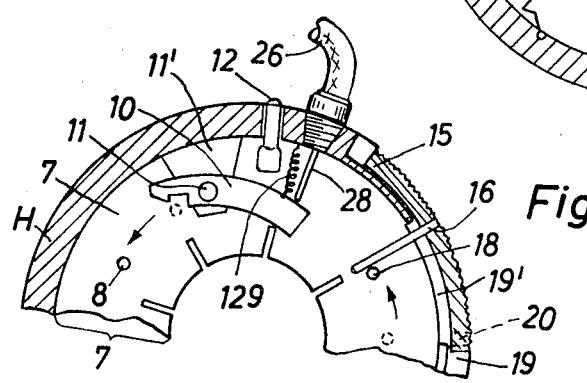

3,590,714

PHOTOGRAPHIC APPARATUS WITH TWO-WAY OBJECTIVE

BACKGROUND OF THE INVENTION

The present invention relates to photographic apparatus in general, and more particularly to improvements in photographic apparatus which utilize removable two-way objectives capable of being mounted in two different positions.

It is already known to provide a camera with an objective which can be mounted on the camera body in two positions, namely, in a normal first position in which the camera can make exposures with a normal (smaller) picture scale and a second position to make pictures with a larger picture scale. If the camera is equipped with a built in exposure control which effects automatic selection of the aperture size and/or exposure time, the objective must be mounted on the camera body in such a way that its diaphragm is properly coupled to the exposure control at least in one position of the objective, normally in the aforementioned first position. In such instances, the objective must be equipped with additional parts which permit proper adjustment of the diaphragm in the second position of the objective and do not interfere with proper coupling of the diaphragm with the exposure control in the first position of the objective. Heretofore known two-way objectives are not entirely satisfactory in the above respects.

SUMMARY OF THE INVENTION

An object of the invention is to provide a photographic apparatus for use with an invertible two-way objective and to construct the objective and the supporting or holding structure therefor in such a way that the diaphragm in the objective can be readily and accurately coupled to the exposure control in the camera body in one position and is adjustable independently of the exposure control in the other position of the objective.

Another object of the invention is to provide a novel diaphragm for a two-way objective of the above outlined character.

A further object of the invention is to provide an objective which can be coupled to the camera body without any danger of damaging or destroying sensitive components of the exposure control and which can be readily manipulated by skilled photographers as well as by beginners and amateurs.

The invention is embodied in a photographic apparatus, e.g., a still camera, which comprises a preferably ring-shaped holder mounted on the camera body, an invertible two-way objective separably connectable with the holder in two different positions, diaphragm means provided in the objective and including blade means, setting means coupled with the blade means and movable to and from an uncocked position in which the blade means defines an aperture of predetermined size (preferably an aperture of zero size), and selector means accessible to the user of the camera in one position of the objective with reference to the holder and cooperating with the setting means to select for the blade means a plurality of additional positions in each of which the blade means defines an aperture of a different size, and inactivating means (for example, a cam provided in or on the holder) operative to effect movement of the setting means to uncocked position in response to connection of the objective with the holder in the other position of the objective.

In accordance with a feature of the invention, the selector means must be moved to an end position in which it permits movement of the setting means to uncocked position before the user can connect the objective to the holder in the other position of the objective, namely, in that position in which the selector means is not accessible.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a partly elevational and partly sectional view of an invertible two-way objective which can be utilized in the photographic apparatus of my invention;

FIG. 2 is a fragmentary axial sectional view of a holder which is installed in or on the body of a photographic apparatus and can be connected with the objective of FIG. 1;

FIG. 3 is a fragmentary end elevational view of the holder as seen from the left-hand side of FIG. 2;

FIG. 4 is a sectional view substantially as seen in the direction of arrows from the line IV–IV of FIG. 1 and illustrates the setting means of the diaphragm in the objective in cocked position; and FIG. 5 illustrates a portion of the structure shown in FIG. 4 but with the setting means in uncocked position.

DESCRIPTION OF THE PREFERRED EMBODIMENTS

Referring first to FIG. 1, there is shown an invertible or two-way objective 1 which can be mounted in a ring-shaped holder 2 (FIGS. 2 and 3) in either one of two positions. In the normal position in which the camera embodying or carrying the holder 2 can make pictures of normally reduced size, the end 3 of the objective 1 faces the film in the camera and the end 4 of the objective faces the subject. The right-hand part of the objective 1 is then inserted into the holder 2; the latter is provided with a threaded connector 2'. When the objective 1 is mounted in inverted position, its end 3 faces the subject and the end 4 faces the camera body. In the aforementioned normal position of the objective 1, an arcuate coupling portion 5' extends into a complementary groove 5" of the holder 2 so that the parts 1 and 2 are connected to each other substantially in bayonet lock fashion. The groove 5" of the holder 2 receives a second arcuate coupling portion 5 of the objective 1 when the latter is attached to the holder in inverted position.

The connector 2' enables the user of the camera to move the holder 2 and objective 1 in the direction of the optical axis.

Referring now to FIGS. 1 and 4, the objective 1 includes an adjustable diaphragm which can furnish a series of aperture sizes in each position of the objective. The diaphragm comprises a ring-shaped setting member 7 which is rotatable in the housing or shell H of the objective 1 and is biased by a helical spring 6 so that it normally assumes an uncocked position in which the diaphragm is closed, i.e., in which the blades 7" of the diaphragm define an aperture of zero size. The setting member 7 may be cocked by rotation in a clockwise direction to thereby stress the spring 6 and to move the blades 7" to positions in which they define an aperture of maximum size. The setting member 7 includes a pin or post 8 which can be received in the notch 9 of a two-armed locking or retaining lever 10. This lever is pivotable on a pin 11 and is biased by a spring 129 so that it automatically holds the setting member 7 in cocked position when the pin 8 extends into the notch 9. The cocked position of the setting member 7 is shown in FIG. 4.

As illustrated in FIG. 1, the setting member 7 is installed between an end wall 3' of the housing H and a blade-supporting plate or disc 7' which is fixedly mounted in the housing H and supports the blades 7". The setting member 7 is provided with radially extending slots 24 (FIGS. 4 and 5) and the blades 7" have follower pins (not shown) which extend into the slots 24 and slide therein in response to angular movement of the setting member 7 with reference to the disc 7'. This causes the blades 7" to define an aperture of desired size, depending on the angular position of the setting member 7.

The pivot 11 of the locking lever 10 is mounted on a bracket 11' which is fixedly installed in the housing H. One means for disengaging the lever 10 from the pin 8 of the setting member 7 comprises a radial follower 12 which extends outwardly through a hole 13 in the housing H. When the locking lever 10 engages the setting member 7 and holds it in the cocked position of FIG. 4, the outer end portion of the follower 12 extends radially beyond the housing H. The latter is further provided with a tapped bore 14 to facilitate connection of one wire release 26 of a twin or dual release 25 shown in FIG. 4. The other wire release 27 of the dual release 25 is connected with the shutter actuating mechanism of the camera. To facilitate manual cocking of the setting member 7, the latter is provided with a knurled or milled extension 29 which extends through an elongated arcuate slot 30 of the end wall 3' in the housing H.

When the user has cocked the setting member 7 by moving the extension 29 in a clockwise direction to advance the pin 8 from the solid-line position of FIG. 5 to the solid-line position of FIG. 4, the pin 8 enters the notch 9 and the locking lever 10 thereupon retains the setting member 7 in cocked position under the action of the spring 129. The means for determining the size of the aperture defined by the blades 7" in the course of an exposure comprises a manually movable first selector 15 which is installed in the housing H and is accessible from without. This selector carries a stop in the form of a rod 16 which extends radially inwardly through a circumferentially extending arcuate slot 19' of the housing H. The outer end portion of the stop 16 may constitute an index which is movable into registry with various graduations provided on a scale carried by the housing H adjacent to the path of movement of the selector 15. As shown in FIG. 1, the scale can be applied directly to the external surface of the housing H (f/stops 1.8 and 22 shown). To make an exposure, the user of the camera first cocks the setting member 7 by moving the pin 8 into engagement with the locking lever 10. The user thereupon adjusts the selector 15 to select a desired aperture size, i.e., a certain position of the stop 16. In the next step, the user depresses the knob 25a of the dual release 25 whereby the inner wire 28 of the first wire release 26 disengages the locking lever 10 from the pin 8 (arrow 17 in FIG. 4) so that the setting member 7 can rotate in counterclockwise direction to the extent determined by the selected position of the stop 16. To this end, the setting member 7 has a stud 18 which assumes the solid-line position of FIG. 4 in cocked position of the setting member 7 and engages the stop 16 (FIG. 5) when the locking lever 10 is disengaged from the pin 8, i.e., when the spring 6 is free to rotate the setting member from the position of FIG. 4 to that shown in FIG. 5. Once the stud 18 engages the stop 16, the blades 7" define an aperture of selected size and the wire release 27 thereupon opens the shutter for a necessary period of time to make the exposure. The selector 15 is movable in an arcuate recess 19 provided therefor in the housing H.

The just described operations can be carried out when the objective 1 is connected with the holder 2 in such a way that the groove 5" receives the arcuate coupling portion 5 so that the end 3 of the objectives 1 faces toward the subject and the selector 15 is readily accessible in front of the holder 2. If the user thereupon wishes to use the objective 1 in its normal position in which the end 3 faces toward the film in the camera body, the coupling portion 5 is withdrawn from the groove 5" and the selector 15 is moved to the end position shown in FIG. 1 in which the stop 16 permits complete closing of the blades 7" as soon as the pin 8 is disengaged from the locking lever 10. The selector 15 is thereby moved away from the space between two aligned axially parallel guide grooves 20, 20a in the external surface of the housing H (see FIG. 1) so that the housing H can be introduced into the holder 2 (with the end wall 3' located in front) whereby a radially inwardly extending projection or male guide 21 of the holder 2 travels in guide grooves 20a, 20 and ultimately enters a circumferential guide groove 23 of the housing H. This occurs at a time when the coupling portion 5' moves into alignment with the groove 5". The user is then in a position to rotate the objective 1 so that the projection 21 travels in the groove 23 away from the left-hand end of the axially parallel groove 20 and prevents unintentional or uncontrolled separation of the objective 1.

As stated above, the outer end portion of the follower 12 extends from the housing H when the locking lever 10 engages the setting member 7 in the cocked position shown in FIG. 4. This follower 12 is engaged by a conical inactivating cam 22 of the holder 2 during insertion of the housing H into the holder so that the follower 12 automatically disengages the locking lever 10 from the pin 8 and enables the spring 6 to return the setting member 7 to uncocked position. Since the housing H can be inserted into the holder 2 only when the selector 15 assumes the end position shown in FIG. 1, the blades 7" automatically define an aperture of zero size when the objective 1 is properly coupled to the holder 2 in its normal position, i.e., in a position in which the selector 15 is concealed in the interior of the holder. The follower 12 and the inactivating cam 22 constitute a safety feature which insures that the locking lever 10 is invariably inactive or ineffective during insertion of the housing H into the holder 2.

The setting member 7 is cocked in response to proper attachment of the objective 1 to the holder 2 in normal position of the objective (i.e., in that position in which the end 4 faces the scene). This is achieved by the provision of a cocking lever 33 which is located in the holder 2 or in the camera body and is turnable with a shaft 34. The setting member 7 has an axially parallel motion receiving pin 31 (FIG. 1) which extends outwardly through an arcuate slot 32 in the end wall 3' and is engaged by the lever 33 when the objective 1 is rotated in a direction to move the projection 21 in the groove 23 away from the adjoining end of the groove 20. Suitable releasable locking means (not shown) which preferably operate by snap action are provided on the holder 2 to engage and retain the objective 1 in fully inserted normal position in which the projection 21 is received in the groove 23 and is remote from the groove 20.

As stated above, the lever 33 cocks the setting member 7 in response to proper insertion of the objective 1 into the holder 2. Since the first selector 15 is not accessible, the camera is provided with a second selector which includes a lever 35 (FIG. 3) mounted on an axially parallel shaft 36 which extends through an elongated arcuate slot 36' of the end wall 2" in the holder 2. The lever extending into the path of movement of the milled extension 29 of the setting member 7. The extension 29 moves from the solid-line position to the broken-line position of FIG. 3 in response to movement of the projection 21 in the groove 23 in a direction away from the groove 20, i.e., in response to movement of the pin 31 toward engagement with the lever 33 and during the ensuing cocking of the setting member 7.

In order to select the aperture size when the first selector 15 is not accessible, the user or the automatic exposure control of the camera moves the shaft 36 to a desired angular position to locate the selector lever 35 at a desired distance from the milled extension 29 (in the broken-line position of the extension 29 as viewed in FIG. 3). The user or the exposure control thereupon turns the lever 33 and its shaft 34 in a clockwise direction, as viewed in FIG. 3, to the broken-line position of the lever 33, whereby the spring 6 is free to rotate the setting member 7 in a counterclockwise direction until the extension 29 reaches the selector lever 35 on the shaft 36. The shaft 36 can be adjusted by a suitable ring (not shown) on the holder 2 and the lever 33 can be moved to the broken-line position of FIG. 3 by the shutter release (not shown) of the camera so that the blades 7" define an aperture of desired size (determined by the angular position of the selector lever 35) before the shutter opens. The shaft 36 can be mounted on a second selector (not shown) in the holder or in the camera body or on a turnable level at the end wall 2" of the holder 2 and in contact with a ring in a suitable adapter, for example, in an adapter of the type disclosed in my copending application of even date.

Upon completion of the exposure, the setting member 7 is cocked again by rotating the cocking lever 33 from the broken-line position to the solid-line position of FIG. 3. The lever 33 then holds the setting member 7 in cocked position by way of the motion receiving pin 31 until the user decides to make a further exposure. Such exposure can be made without changing the position of the selector lever 35 or subsequent to movement of this lever to a different angular position which corresponds to a different aperture size.

It will be seen that the user is compelled to carry out at least one precautionary measure prior to insertion of the objective 1 in its normal position, namely, in the position in which the first selector 15 is concealed. This involves moving the first selector 15 to the end position shown in FIG. 1 in order to enable the projection 21 of the holder 2 to enter the axially parallel groove 20 of the housing H. Also, the improved arrangement insures that the locking lever 10 is disengaged from the pin 8, i.e., that the diaphragm is closed not later than at the time when the projection 21 enters the circumferential groove 23 of the housing H. This is due to the fact that the follower 12 tracks the inactivating cam 22 at a time when the first selector 15 is in that end position in which its stop 16 allows unimpeded travel of the stud 18 to a position in which the setting member 7 assumes its uncocked position so that the blades 7" reduce the aperture size to zero. The grooves 20, 20a and 23 insure that the objective 1 is coupled to the holder 2 in an optimum position for engagement of sensitive camera parts with the diaphragm so that such parts are not damaged during attachment of the objective, namely, during insertion of the housing H into the holder 2.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What I claim as new and desired to be protected by Letters Patent is set forth in the appended

1. In a photographic apparatus, a combination comprising a holder; an invertible two-way objective separably connectable with said holder in two different positions; diaphragm means provided in said objective and including blade means, setting means coupled with said blade means and movable from a cocked position to an uncocked position in which said blade means defines an aperture of predetermined size, and selector means cooperating with said setting means to select a plurality of additional positions for said blade means, said selector means being accessible to the user's hand in one position of said objective with reference to said holder; and inactivating means provided on said holder and operative to effect movement of said setting means to uncocked position in response to connection of said objective with said holder in the other position of the objective.

2. A combination as defined in claim 1, wherein said selector means is movable by hand to an end position in which it permits movement of said setting means to uncocked position, and wherein said holder and said objective comprise complementary guide means which are movable into engagement with each other to permit connection of the objective in said other position upon movement of said selector means to said end position thereof.

3. A combination as defined in claim 1, further comprising locking means provided in said objective and operative to engage and retain said setting means in cocked position in the one position of said objective, disengaging means movably installed in said objective and movable by said inactivating means in response to connection of the objective in said other position thereof to thereby disengage said locking means from said setting means and means for biasing said setting means to uncocked position.

4. A combination as defined in claim 3, wherein said disengaging means comprises a follower and said inactivating means comprises a cam which engages and moves said follower during connection of said objective in said other position thereof.

5. A combination as defined in claim 1, wherein said holder comprises a projection and said objective comprises a housing having an external axially parallel groove and a circumferential groove, said projection travelling in said axially parallel groove and thereupon in said circumferential groove during connection of said objective in the other position thereof.

6. A combination as defined in claim 5, further comprising an exposure control having elements engaging said setting means in the other position of said objective.

7. A combination as defined in claim 1, further comprising locking means provided in said objective and operative to engage and retain said setting means in cocked position in the one position of said objective, disengaging means including a wire release connectable with said objective in said one position of the objective and actuatable to disengage said locking means from said setting means, and means for biasing said setting means to uncocked position.

8. A combination as defined in claim 1, wherein said objective comprises a housing and said selector means is movable in a recess provided therefor in said housing said diaphragm means further comprising biasing means for urging said setting means toward uncocked position and said selector means comprising stop means movable into the path of movement of said setting means from cocked toward uncocked position to thereby locate said setting means in an intermediate position in which said blade means defines an aperture of desired size.

9. A combination as defined in claim 8, wherein said housing is provided with external groove means and wherein said recess extends across said groove means, said selector means being movable in said recess to an end position in which said stop means thereof permits movement of said setting means to uncocked position and said holder including a projection which is free to move in said groove means across said recess during connection of the objective in said other position and subsequent to movement of said selector means to said end position thereof.

10. A combination as defined in claim 9, wherein said recess extends in the circumferential direction of said housing and said groove means includes two registering axially parallel grooves, said selector means being located between said axially parallel grooves on movement away from said end position thereof.